United States Patent [19]

Thatcher

[11] Patent Number: 4,973,819
[45] Date of Patent: Nov. 27, 1990

[54] GANTRY WITH A LASER MOUNTED NUMERICALLY CONTROLLED CARRIAGE

[75] Inventor: Bryan C. Thatcher, Santa Ana, Calif.
[73] Assignee: McDonnell Douglas Corporation, Long Beach, Calif.
[21] Appl. No.: 412,452
[22] Filed: Sep. 26, 1989
[51] Int. Cl.$^5$ .............................................. B23K 26/00
[52] U.S. Cl. ........................ 219/121.78; 219/121.63; 219/121.67; 219/121.7
[58] Field of Search .................. 219/121.78, 121.79, 219/121.8, 121.81, 121.6, 121.85, 121.82, 121.63, 121.64, 121.67, 121.72, 121.13, 121.14

[56] References Cited

U.S. PATENT DOCUMENTS

| | | | |
|---|---|---|---|
| 4,039,799 | 8/1977 | Stumpf | 219/121.78 |
| 4,317,021 | 2/1982 | Walch et al. | 219/121.78 |
| 4,455,893 | 6/1984 | Astero | 219/121.78 |
| 4,537,809 | 8/1985 | Ang et al. | 219/121.67 X |
| 4,542,278 | 9/1985 | Taylor | 219/121.78 |
| 4,659,900 | 4/1987 | Gilli et al. | 219/121.78 |
| 4,659,902 | 4/1987 | Swensrud et al. | 219/121.78 |
| 4,687,901 | 8/1987 | Binder et al. | 219/121.78 |
| 4,700,044 | 10/1987 | Hokanson et al. | 219/121.63 |
| 4,700,045 | 10/1987 | Merry et al. | 219/121.78 |
| 4,710,606 | 12/1987 | Soroka et al. | 219/121.78 |

FOREIGN PATENT DOCUMENTS

| | | | |
|---|---|---|---|
| 3400017 | 8/1985 | Fed. Rep. of Germany | 219/121.78 |
| 0110885 | 5/1987 | Japan | 219/121.64 |

OTHER PUBLICATIONS

M. Eboo et al. "Arc-Augmented Laser Welding", Advances in Welding Processes, Fourth International Conference, May 9–11, 1978, pp. 257–265.

*Primary Examiner*—C. L. Albritton
*Attorney, Agent, or Firm*—Ben J. Yorks; George W. Finch; John P. Scholl

[57] ABSTRACT

A gantry, having a high powered laser, up to 2,000 watts or larger, mounted on a numerically controlled carriage. The gantry is constructed to support and rapidly move the laser, and a laser delivery system, about a work cell, such that the laser is constantly in close proximity to the working area of a workpiece.

5 Claims, 3 Drawing Sheets

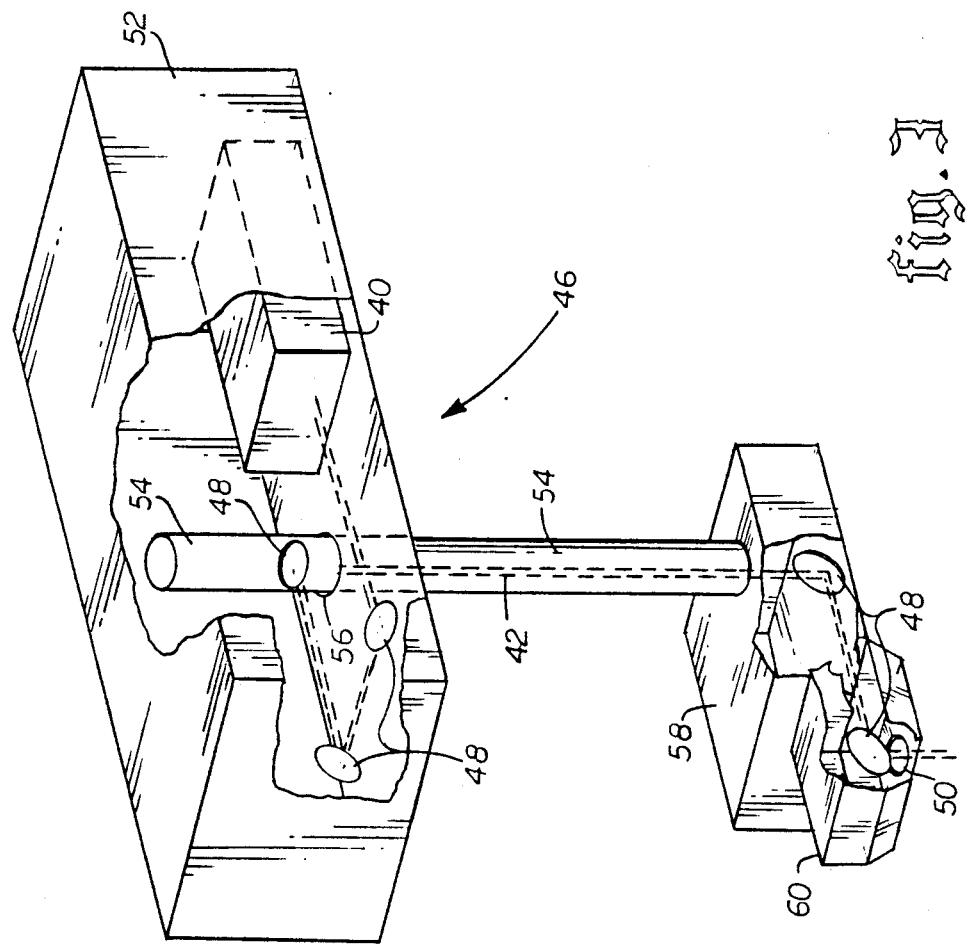

GANTRY WITH A LASER MOUNTED NUMERICALLY CONTROLLED CARRIAGE

BACKGROUND OF THE INVENTION

Use of numerically controlled systems have greatly improved the speed and repeatability of such production techniques as welding, drilling and cutting. With the advent of laser technology it has been discovered that a laser can perform some production methods more accurately than standard mechanical tools. When combined with a numerically controlled machine, the laser provides a manufacturing system that can be both accurate and fast. Typically, numerically controlled gantry systems are capable of transversing a tool over a workpiece at 2,200-2,400 inches per minute (IPM). To properly utilize the potential of these gantry systems, the laser should be able to perform the working function, whether it is cutting, welding or drilling, at approximately the same speed as the gantry. Generally speaking, workrates for lasers is a function of laser power. To obtain a workrate in the order of 2,000 IPM, high powered lasers in the range of 400-2,000 watts are required.

Prior high powered laser gantry systems include the one disclosed in Swensrud, U.S. Pat. No. 4,661,680 which places a laser at a fixed position on the floor, and uses a laser delivery system to deliver a laser beam to the workpiece. When the workpiece is large, such as a sheet of airplane skin, a gantry in the range of 40 feet is required. Because the laser is stationary, the laser beam would have to travel at least 20 feet to perform work at the end of the gantry. Travelling long distances can result in excessive beam divergence, that can reduce the power of the laser when it reaches the workpiece.

Using a floor mounted laser can also result in unpredictable laser beam location as the beam travels through the laser delivery system. Typically, to deliver a laser beam to a workpiece, a series of mirrors is required to direct the laser to the location of the piece. To insure that the laser beam will be directed to the desired location, the reflection angle of the beam off the mirrors must be constant. If the laser is placed on the floor and the mirrors are attached to the gantry, any thermal expansion, vibration or shift of the gantry will move the mirrors relative to the laser, causing a change in the reflection angle, making laser beam location unpredictable.

Therefore, it is desirable to have a numerically controlled gantry with a high powered laser, that is in constant close proximity to a workpiece, and has a mirror delivery system that provides beam location.

SUMMARY OF INVENTION

This invention is a gantry, having a laser and laser delivery system mounted to a numerically controlled carriage. The gantry and carriage are of such construction and strength to support a high powered laser up to 2,000 watts or larger. The gantry is provided with means to rapidly transport the laser and laser delivery system, about the gantry, allowing the laser delivery system to provide a laser beam to any x, y, z coordinate within the workcell of the gantry. The gantry may have a numerical control console that directs the movement of the carriage and laser delivery system, such that the gantry can perform preprogrammed manufacturing methods on various workpieces. By mounting the laser and delivery system on the carriage, the laser is constantly kept in close proximity to the workpiece, reducing the amount of beam travel and beam divergence.

The laser delivery system typically has a series of mirrors that delivers the laser beam from the laser to the workpiece. Because both the laser and the mirrors are mounted to the carriage, the relative position of the mirrors to the laser is always the same. If the gantry shifts or expands, both the laser and the mirrors see approximately the same displacement, in which case the reflective angle of the laser is relatively constant.

Therefore it is an object of this invention to provide a numerically controlled gantry capable of supporting and transporting a high powered laser to a point in close proximity with the working area of a workpiece.

It is also an object of this invention to provide a numerically controlled gantry with a laser and laser delivery system that provides predictable laser beam placement.

DETAILED DESCRIPTION OF THE DRAWINGS

The objectives and advantages of the invention, together with any additional advantages, will become more apparent to one skilled in the art, after considering the following detailed description and drawings, wherein:

FIG. 3 is a diagrammatical representation of a laser delivery system.

DETAILED DESCRIPTION OF THE DRAWINGS

Figure 1:
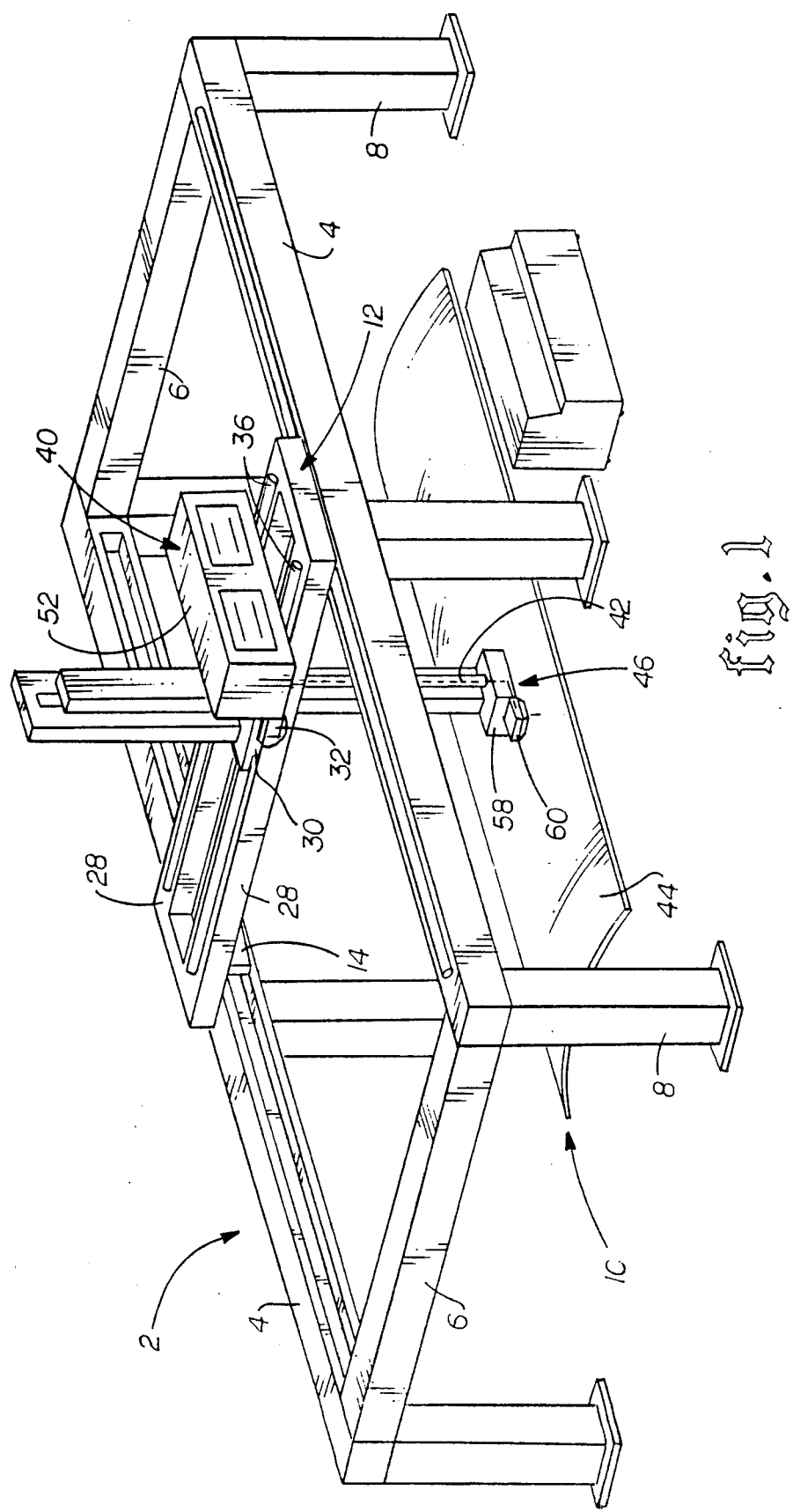
FIG. 1 is a view of a gantry having a laser mounted to a numerically controlled carriage.
Figure 2:
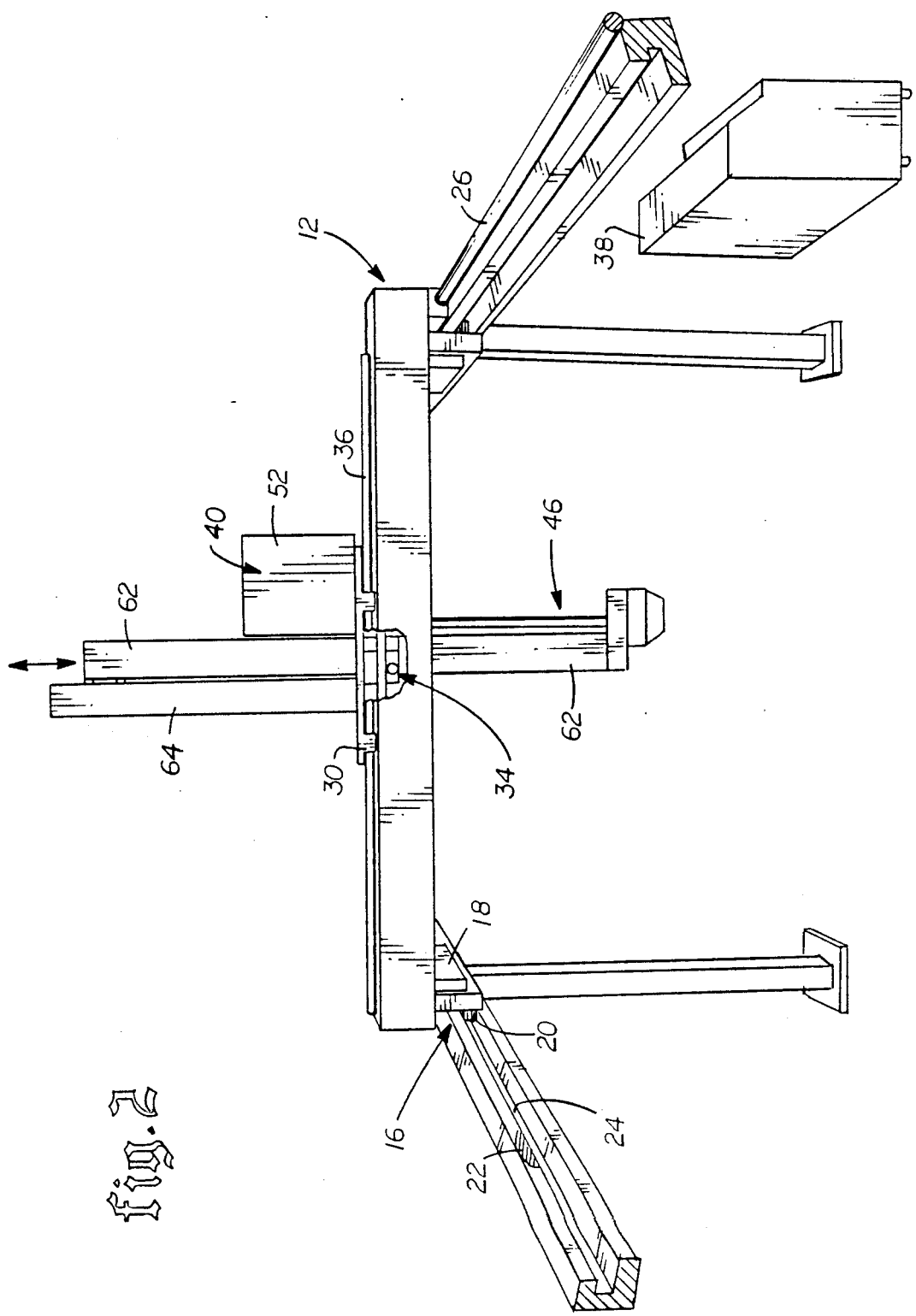
FIG. 2 is a three dimensional cross-sectional view of a gantry, similar to the gantry shown in FIG. 1.

Referring to the drawings more particularily by reference numbers, FIG. 1 shows a numerically controlled gantry 2 having X, Y and Z coordinates as indicated. The gantry 2 can be a conventional numerically controlled system such as the GANTRY INDUSTRIAL ROBOT T3886 produced by Cincinnati Milacron. The gantry 2 has two essentially parallel X-beams 4 attached to a pair of end beams 6, which are all supported by a plurality of support post 8 that elevate the end beams 6, and X-beams 4 above a workcell 10. The posts 8, X-beams 4 and end beams 6 are made from a high strength material of sufficient dimension to provide a rigid structure. Resting essentially perpendicular to the X-beams 6, is a Y-frame 12. The Y-frame 12 has a X-drive mechanism 14, that moves the Y-frame 12 along the X-axis of the gantry 2. The X-drive mechanism 14 may be a rack and pinion drive 16 as shown in FIG. 2, where electric motors 18 drive spur gears 20 along racks 22, that are located along grooves 24 in the X-beams. One of the X-beams 4 may have an X-rail 26 that the Y-frame 12 follows as it travels along the X-axis of the gantry 2. The X-rail 26 provides accurate location of the Y-frame 12, as it moves along the X-axis of the gantry 2.

The Y-frame 12 has a pair of Y-beams 28 that support a carriage 30, see FIG. 1. The carriage 30 has a Y-drive mechanism 32 that moves the carriage 30 along the Y-beams 28. As shown in FIG. 2, the Y-drive mechanism 32 can be a rack and pinion drive 34, that is similar to the drive described with respect to the X-drive mechanism 14. Similarily, a pair of Y-rails 36 may be used to accurately locate the carriage 30 along the Y-axis of the gantry 2.

The X and Y drive mechanisms can be controlled by a conventional numerical control console ,38, that Provides input to the mechanism's electric motors 18 in accordance with a computer program that is loaded into the console 38. The combination of drive mechanisms 16 and console 38 allows the carriage 30 to be located along any series of x, y coordinates in the gantry workcell 10, in accordance with the instructions of the console program, as is well known in the art.

Mounted on top of the carriage 30 is a laser 40. The laser 40 provides a laser beam 42, that is directed to a workpiece 44, by a laser delivery system 46. The laser delivery system 46 is also connected to the carriage 30. The laser 40 may be of any type, be it $CO_2$, Nd:Yag, or the like. Because of the structural integrity of the gantry 2, a large high powered laser, up to 2,000 watts or larger, can be attached to the carriage 30. By mounting the laser 40 to the carriage 30, the laser 40 remains in close proximity to the workpiece 44, as the laser delivery system 46 moves about the workcell 10, minimizing beam divergence as the laser beam 42 travels from the laser 40 to the workpiece 44. This allows the beam 42 to retain laser power, insuring that the laser beam 42 can perform its desired work function.

As diagrammatically shown in FIG. 3, the laser delivery system 46 may have a series of mirrors 48 that reflect the laser beam 42 until it reaches a focusing lens 50, which concentrates the beam 42 onto the workpiece 44. The position of the mirrors 48 relative to the laser 40 and each other is critical in directing the laser beam 42 to a desired location. For instance, if the delivery system 46 and mirrors 48 were subjected to a shock or vibrational diplacement during operation and the laser 40 was subjected to a different or no displacement, (which could occur if the laser was mounted to the floor and the mirrors were attached to the gantry 2), the laser beam 42 would reflect off the mirrors 48 at a different location on the mirrors, resulting in inaccurate beam location as it reached the workpiece 44. For this reason the laser 40 and mirrors 48 are fixed to a common reference point, the carriage 30, so that any displacement seen by the mirrors 48 will be seen by the laser 40. In the event the gantry 2 is subjected to any shock or vibration, the laser 40 and mirrors 48 have the same relative movement, preventing any misalignment of the laser beam 42 as it reflects off of each mirror 48.

As shown in FIG. 3, the laser delivery system 46 can include a laser housing 52 that contains the laser 40 and mirrors 48 that directs the laser beam 42 to a tube 54. The tube 54 is received by an aperture 56 in the housing, such that the tube 54 may move relative to the housing 52 along the z-axis of the gantry 2. The tube 54 is attached to a first wrist 58, which is attached to a second wrist 60 that contains the focusing lens 50. The wrists contain mirrors 48 that direct the laser beam 42 to the focusing lens 52, where the beam 42 is focused onto a workpiece 44. The first wrist 58 is attached to a Z-frame 62. The Z-frame 62 is connected to a Z-drive mechanism 64 that is mounted to the carriage 30, as shown in FIG. 2. The Z-drive mechanism 64 moves the Z-frame 62 and connected focusing lens 50 along the Z-axis of the gantry 2. The Z-drive mechanism 64 may be a conventional ball screw drive that is controlled by the control console 38, which causes the Z-frame 62 and connected focusing lens 50, to move along the Z-axis according to the instructions of the console program.

The first wrist 58 can be rotated, by conventional means not shown, about the Z-axis, moving the second wrist 60 in the X-Y plane. The second wrist 60 may be rotated, by conventional means not shown, to move the focusing lens 50 in the X-Z or Y-Z planes. The wrists gives two more degrees of freedom, providing the gantry 2 with more versatility. The mirrors 48 always remain in a fixed position relative to each other, even when the z-frame 62 or wrist move, such that the travel of the laser beam 42 and the reflection angle of the beam 42 is essentially constant.

Another laser delivery system embodiment could be a laser 40 that fires a beam 42 directly down the z-axis of the tube 52 to the workpiece 44. In this configuration there would be no wrist or the need for any mirrors 48. In addition, fiber optics may be used instead of mirrors 48, to delivery the laser beam 42 from the laser 40 to the workpiece 44.

The gantry 2 is capable of providing a laser beam 42 at any x, y, z coordinate of the workcell 10, whereby the beam 42 can perform a work function on a workpiece 44, whether it be cutting, welding, scribing, etc. By mounting the laser 40 on the gantry carriage 30, gantry lengths up to 40 feet or longer may used to perform numerically controlled machining operations on large parts, such as those that are typically used in the aerospace industry.

What is claimed is:

1. An apparatus that performs manufacturing methods on a workpiece, comprising:
   (a) a carriage;
   (b) gantry means for supporting said carriage in a first position spaced from said workpiece;
   (c) first drive means operatively connected to said carriage, for moving said carriage along the x and y axis of said gantry means;
   (d) a laser mounted to said carriage that emits a laser beam;
   (e) a laser delivery system mounted to said carriage having at least one mirror that reflects said laser beam onto said workpiece; and
   (f) numerical control console means containing a computer program, for providing operational instructions to said first drive means, such that said carriage in moved about the x and y coordinates of said gantry means in accordance with instructions provided by said computer program.

2. The apparatus as recited in claim 1, further comprising second drive means operatively connected to said laser delivery system, for moving said laser delivery system along the z axis of said gantry means, said second drive means being responsive to said computer program such that said laser delivery system is moved about the z coordinate of said gantry means in accordance with instructions provided by said computer program.

3. The apparatus as recited in claim 1, wherein said laser is of the $CO_2$ type.

4. The apparatus as recited in claim 1, wherein said laser is of the Nd:Yag type.

5. The apparatus as recited in claim 1, wherein said laser is capable of providing up to 2,000 watts of power.

* * * * *